United States Patent
Shaffer et al.

(10) Patent No.: US 6,550,965 B2
(45) Date of Patent: Apr. 22, 2003

(54) RECLOSABLE PLASTIC BAG AND METHOD FOR FORMING

(75) Inventors: Gregory R. Shaffer, Martinsburg, WV (US); Charles Stempka, Mechanicsburg, PA (US)

(73) Assignee: Aeroquip Corporation, Maumee, OH (US)

( * ) Notice: Subject to any disclaimer, the term of this patent is extended or adjusted under 35 U.S.C. 154(b) by 0 days.

(21) Appl. No.: 09/768,422

(22) Filed: Jan. 24, 2001

(65) Prior Publication Data

US 2001/0002218 A1 May 31, 2001

Related U.S. Application Data

(63) Continuation of application No. 09/384,883, filed on Aug. 27, 1999, now abandoned.

(51) Int. Cl.[7] .............................................. B65D 33/24
(52) U.S. Cl. ........................ 383/65; 383/63; 24/585.12
(58) Field of Search ................... 383/63, 65; 24/30.5 R, 24/516, 584.1, 585.12; 156/66; 493/214

(56) References Cited

U.S. PATENT DOCUMENTS

| | | | | |
|---|---|---|---|---|
| 3,226,787 | A | 1/1966 | Ausnit | 24/201 |
| 3,347,298 | A | 10/1967 | Ausnit et al. | 150/3 |
| 3,425,469 | A | 2/1969 | Ausnit | 150/3 |
| 3,509,927 | A | 5/1970 | Hasty et al. | 150/3 |
| 3,532,571 | A | 10/1970 | Ausnit | 156/91 |
| 3,633,642 | A | 1/1972 | Siegel | 150/3 |
| RE28,969 | E | 9/1976 | Naito | 150/3 |
| 4,341,575 | A | 7/1982 | Herz | 156/66 |
| 4,354,541 | A | 10/1982 | Tilman | |
| 4,363,345 | A | 12/1982 | Scheibner | 150/3 |
| 4,430,070 | A | 2/1984 | Ausnit | 493/215 |
| 4,516,268 | A | 5/1985 | Kamp | 383/63 |
| 4,528,224 | A | 7/1985 | Ausnit | 428/36 |
| 4,561,109 | A | 12/1985 | Herrington | 383/65 |
| 4,601,694 | A | 7/1986 | Ausnit | 493/381 |
| 4,617,683 | A | 10/1986 | Cristoff | 383/65 X |
| 4,673,373 | A | 6/1987 | Herring et al. | 446/378 |
| 4,682,366 | A | 7/1987 | Ausnit et al. | 383/65 |
| 4,691,373 | A | 9/1987 | Ausnit | 383/63 |
| 4,701,358 | A | 10/1987 | Behr et al. | 428/35 |
| 4,710,968 | A | 12/1987 | Borchardt et al. | 383/63 |
| 4,731,911 | A | 3/1988 | Gould | 24/587 |
| 4,736,450 | A | 4/1988 | Van Erden et al. | 383/65 |
| 4,736,451 | A | * 4/1988 | Ausnit | 383/65 |

(List continued on next page.)

*Primary Examiner*—Jes F. Pascua
(74) *Attorney, Agent, or Firm*—Emch, Schaffer, Schaub & Porcello Co., L.P.A.

(57) ABSTRACT

A reclosable plastic bag includes a pouch and first and second extruded fastener members heat sealed or welded thereto. One of the fastener members is provided with a plurality of standoffs in a flange area providing spaces between it and the opposing flange of the opposing fastening member to permit heat sealing or welding of the fastener members to the respective sidewalls of the pouch without inadvertently heat sealing or welding the flanges of the opposing fastener members together.

4 Claims, 4 Drawing Sheets

U.S. PATENT DOCUMENTS

| | | | |
|---|---|---|---|
| 4,744,674 A | 5/1988 | Nocek | 383/63 |
| 4,756,629 A | 7/1988 | Tilman et al. | 383/63 |
| 4,778,282 A | 10/1988 | Borchardt et al. | 383/63 |
| 4,787,880 A | 11/1988 | Ausnit | 493/213 |
| 4,792,240 A | 12/1988 | Ausnit | 383/63 |
| 4,844,759 A * | 7/1989 | Boeckmann | 383/63 X |
| 4,878,763 A * | 11/1989 | Ausnit | 383/65 X |
| 4,907,321 A | 3/1990 | Williams | 24/587 |
| 4,929,487 A | 5/1990 | Tilman et al. | 428/163 |
| 5,012,561 A | 5/1991 | Porchia et al. | 24/576 |
| 5,017,021 A | 5/1991 | Simonsen et al. | 383/63 |
| 5,056,933 A | 10/1991 | Kamp | 383/63 |
| 5,067,822 A * | 11/1991 | Wirth et al. | 383/63 X |
| 5,138,750 A | 8/1992 | Gundlach et al. | 24/587 |
| 5,192,135 A | 3/1993 | Woods et al. | 383/63 |
| 5,209,574 A | 5/1993 | Tilman | 383/63 |
| 5,211,481 A | 5/1993 | Tilman | 383/63 |
| 5,238,306 A | 8/1993 | Heintz et al. | 383/61 |
| 5,242,516 A | 9/1993 | Custer et al. | 156/66 |
| 5,369,847 A | 12/1994 | Naya et al. | 383/65 X |
| 5,509,734 A * | 4/1996 | Ausnit | 383/63 |
| 5,638,586 A | 6/1997 | Malin et al. | 383/63 X |
| 5,664,303 A * | 9/1997 | Johnson | 24/587 |
| 5,672,009 A * | 9/1997 | Malin | 383/63 X |
| 5,718,024 A * | 2/1998 | Robbins | 383/63 X |
| 5,839,831 A | 11/1998 | Mazzocchi | 383/63 X |
| 6,004,032 A * | 12/1999 | Kapperman et al. | 383/63 X |
| 6,088,998 A * | 7/2000 | Malin et al. | 493/214 X |
| 6,167,597 B1 * | 1/2001 | Malin | 383/63 X |

* cited by examiner

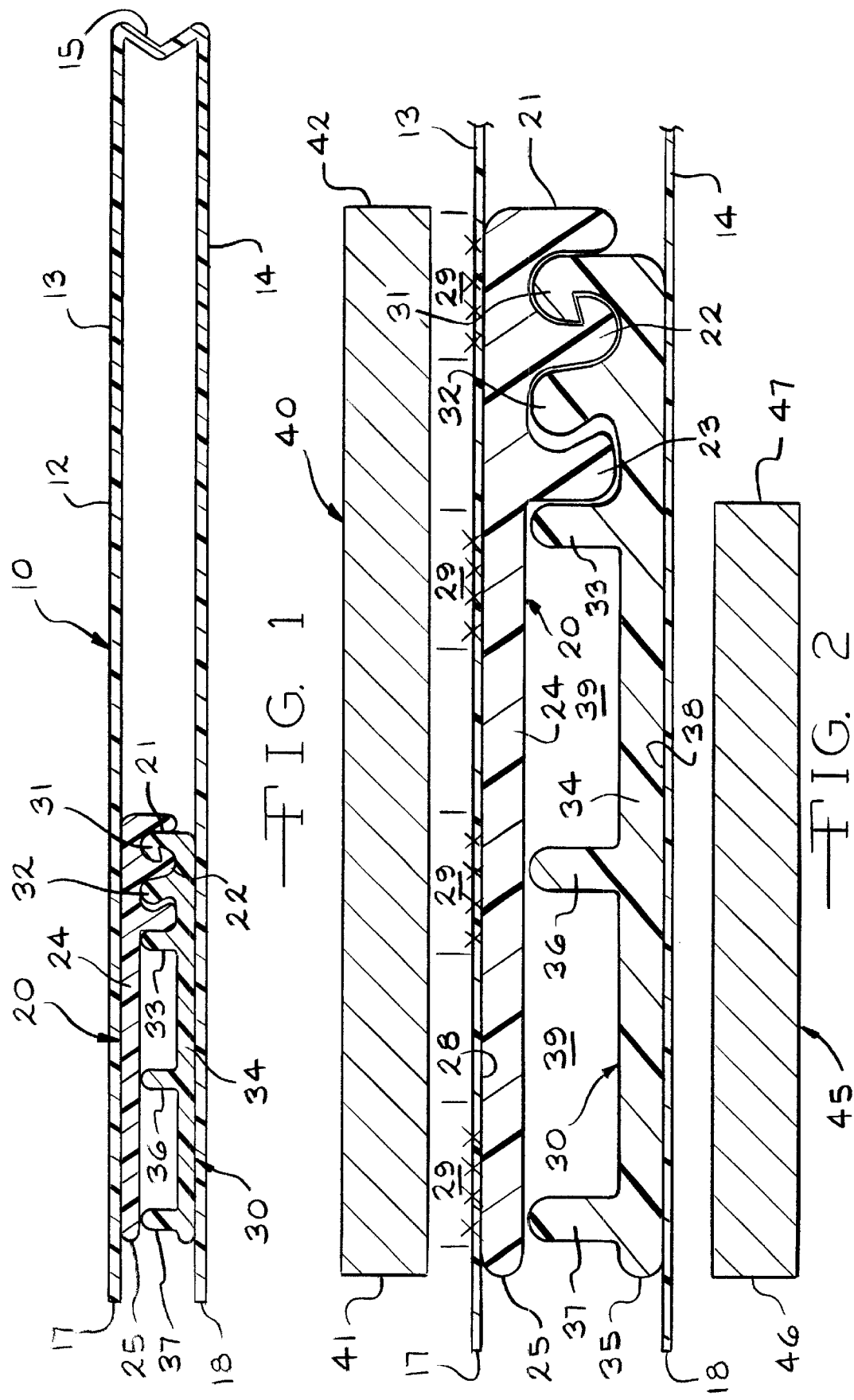

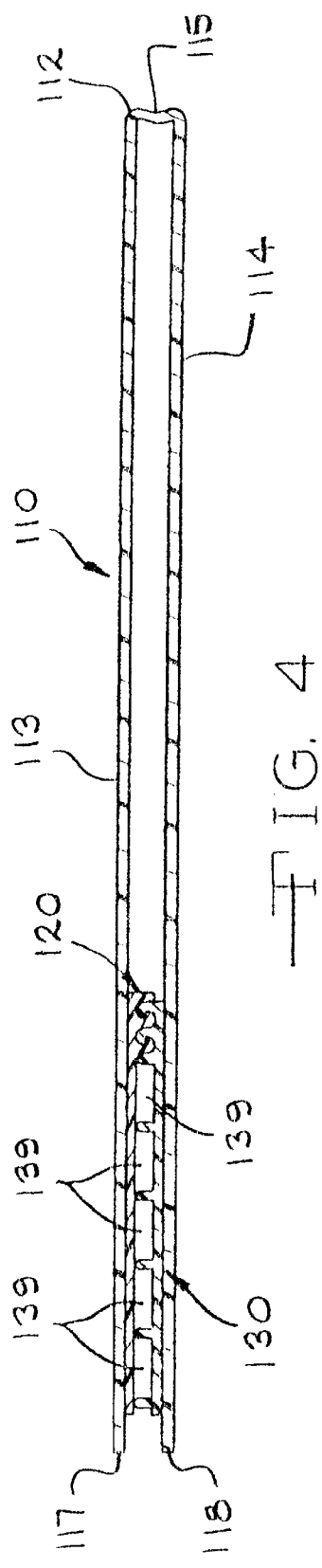
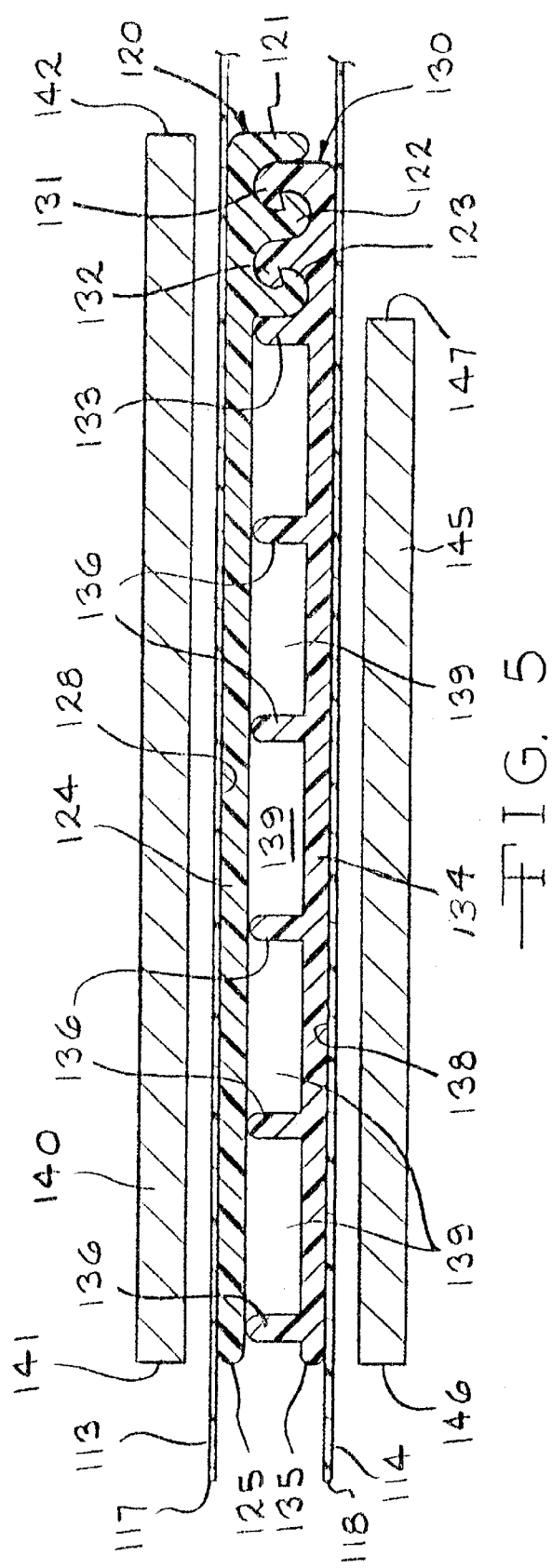

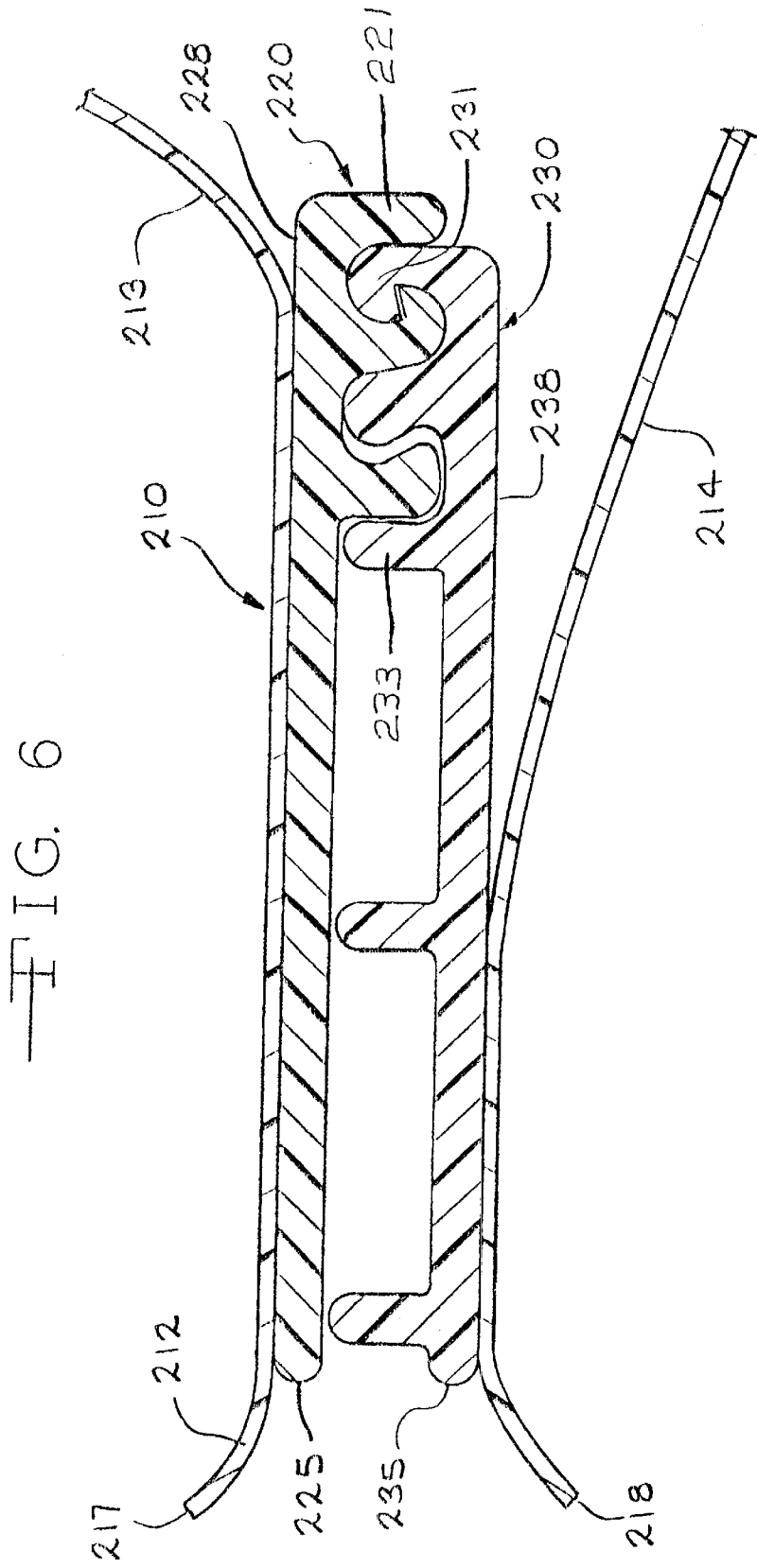

RECLOSABLE PLASTIC BAG AND METHOD FOR FORMING

This application is a continuation of application Ser. No. 09/384,883 filed Aug. 27, 1999 now abandoned.

BACKGROUND OF THE INVENTION

The present invention is directed to a reclosable plastic bag having an extruded fastener and to a method for forming such reclosable bag.

Reclosable plastic bags having extruded fasteners are well known in the art. Frequently the pouch portion is manufactured in one manufacturing operation and the extruded fasteners, manufactured in a different manufacturing operation, are adhered or heat sealed in an area adjacent an opening defined by the edge of the pouch. See for example U.S. Pat. Nos. RE 28,969; 3,633,642; 4,430,070; 4,601,694; 4,673,373; 4,736,451 and 5,017,021. Some of these patents, such as U.S. Pat. No. 3,633,642 provide a design in which the interlocking closure mechanism require the same amount of force to disengage the mechanism from the outboard side as from the inboard side. Others, such as U.S. Pat. Nos. 3,347,298; 3,425,469; 4,430,070; and RE 28,969 provide designs which require less force to open when having their outer peripheral edges pulled by a consumer than is required by opening from the inside, for example, from pressure exerted within the closed bag.

Some designs of extruded fastener elements are provided with a flange of greater thickness than the film material of the pouch which extend outwardly from the hook and groove toward the open end of the pouch to provide greater strength to the bag for opening than would be provided simply by the mouth-opening marginal portions of the pouch formed from the film material.

One method of affixing the extruded fasteners to the pouches utilizes a heat sealing operation for welding the extruded fastener members to the thinner film material. In other instances, adhesive is utilized to effect such connection.

In those instances in which the extruded fasteners are provided with flanges, it has been necessary, in heat sealing or welding the flange areas to the film material of the pouch, to utilize a complicated process to prevent the opposing flanges of the cooperating fastener members from becoming inadvertently welded together. Thus, it is efficient to effect the heat sealing of the fastener members to their respective sides of the pouch forming the mouth-opening by simultaneously passing between heated members both of the extruded fastener members, with each fastener member in interfacial engagement with the film at the respective edges of the pouch adjacent the open ends. The fastener members have substantially flat base surfaces opposite the hook and groove profile. The heated elements cause the film to become heat sealed to the flat base surface of each of the respective extruded fastener members. Although those portions of the- extruded fastener members forming the hooks and grooves have sufficient mass to prevent the hooks from becoming welded in the grooves of the opposing fastener member during heat sealing of the film to the base surfaces, the flanges, although substantially thicker than the film, have substantially less mass than the hook and groove portions of the extruded fasteners. As a result, problems can be encountered with the flanges of the opposing fasteners becoming welded together, thereby rendering the bag being formed unusable.

According to the present invention, the flange of at least one of the extruded fastener members is provided with one or more outwardly extending standoffs, each of which has an end portion in contact with the opposing flange of the opposing fastener member during the welding operation. The standoff elements provide an air gap between major portions of the opposing flanges and serve to prevent inadvertent welding of the opposing flanges together during the step of heat sealing the extruded fastener members to the respective walls of the bag adjacent the mouth opening. The standoff elements are extruded with the other portions of its extruded fastener forming with such other portions a unitary fastener.

Accordingly, it is an object of the present invention to provide a new bag design including an extruded fastener member which may be easily and efficiently assembled.

It is further an object of the present invention to provide a method for assembling a bag and extruded fastener member using a heat sealing process.

Other objects and advantages of the present invention will become readily apparent to those skilled in the art from the following detailed description of the invention.

IN THE DRAWINGS

FIG. 1 is a cross-sectional view of a flexible plastic bag incorporating the features of the present invention.

FIG. 2 is an enlarged sectional view showing the mouth end of the plastic bag and showing schematically heating elements aligned with those portions of the extruded fastener elements to be adhered thereto.

FIG. 4 is a view similar to FIG. 1 showing another embodiment of the present invention.

FIG. 5 is a view similar to FIG. 2 for the embodiment of FIG. 4.

FIG. 6 is a view similar to FIG. 5 showing a further embodiment.

DETAILED DESCRIPTION OF THE INVENTION

Figure 3:
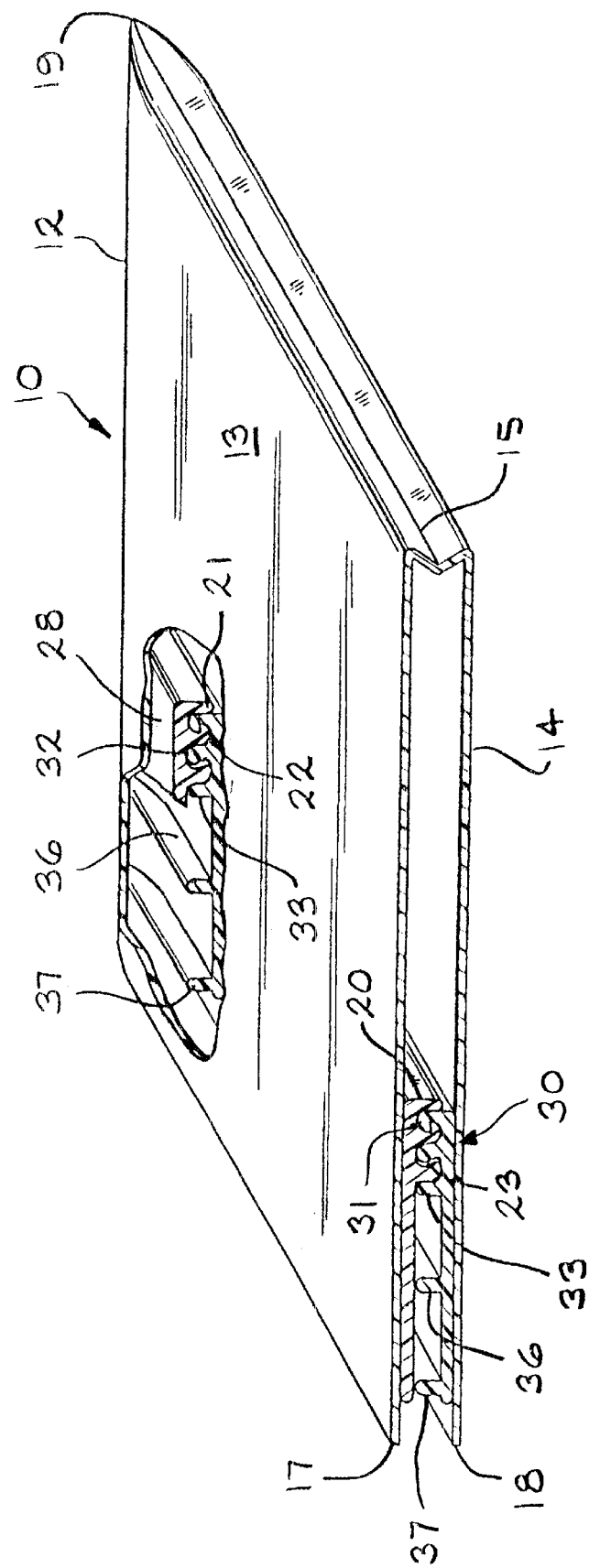
FIG. 3 is a perspective view of the bag shown in FIG. 1.

Referring to FIGS. 1 and 2, there is shown a bag generally designated by the numeral 10 which includes a thin walled plastic pouch 12, a first extruded fastener member 20 and a second extruded fastener member 30. The pouch 12, formed from a sheet of film, and the first and second fastener members 20 and 30 may be one of a variety of plastic materials well known in the art such as low density polyethylene or polypropylene, for example.

The pouch 12 has sidewalls 13 and 14 which extend between a gusseted bottom 15 joining the sidewalls 13 and 14 together and an open mouth defined by edges 17 for sidewall 13 and 18 for sidewall 14. The sidewalls 13 and 14 are joined together at side edges 19 (only one of which is shown in FIG. 3) which extend between the gusseted bottom 15 and the respective edges 17 and 18.

The first fastener member 20 is heat sealed to sidewall 13 and includes (i) a wall 21 extending inwardly toward the sidewall 14 and having a surface facing the gusseted bottom 15, (ii) a first hook 22 spaced therefrom and cooperating therewith to define a first groove and (iii) a second hook 23 spaced from and having a different cross-sectional configuration than the first hook 22 and cooperating therewith to define a second groove. Extending from the second hook 23 toward the edge 17 of sidewall 13 is a flange 24 which has a thickness on the order of as much as two to three times that of the pouch 12. For example, the thickness of the pouch 12 may be in the range of 0.0015 inch to 0.010 inch while the thickness of the flange 24 may be in the range of 0.015 inch. The flange 24 extends to an end 25 which preferably is spaced from the edge 17 of the sidewall 13. The first fastener member 20 has a substantially smooth engagement surface 28 facing and heat sealed or otherwise heat welded to the sidewall 13.

Heat sealed or otherwise heat welded to the other sidewall 14 is the second fastener member 30. The second fastener member 30 includes a first hook 31 which is sized and shaped to be snugly received in the groove defined by the wall 21 and first hook 22 of the first fastener member 20. The second fastener member 30 is further provided with a second hook 32 having a different cross-sectional configuration from that of the first hook 31 of the second fastener member 30. The second hook 32 is sized and shaped to fit in the groove between the first hook 22 and second hook 23 of the first fastener member 20 but is smaller than such groove such that a space is provided between it and the second hook 23 of the first fastener member 20.

Spaced from the second hook 32 is a wall 33 which cooperates with the second hook 32 to defined a groove in which is positioned the second hook 23 of the first fastener member 20. The groove defined by the second fastener member second hook 32 and wall 33 is larger than the second hook 23 of the first fastener member 20.

Extending outwardly toward the edge 18 of the sidewall 14 is a flange 34 which extends to an end 35 spaced inwardly toward the gusseted bottom 15 from the edge 18. Extending outwardly from the flange 34 toward the flange 24 is an intermediate standoff 36 spaced from the wall 33 and an outer standoff 37 spaced from the intermediate standoff 36.

As can be seen in FIG. 3, the first and second hooks 31 and 32, the wall 33 and the standoffs 36 and 37 of the second fastener member 30 extend substantially across the full width of the pouch 12 between the edges 19. Similarly, the wall 21 and hooks 22 and 23 of the first fastener member 20 extend substantially across the full width of the pouch 12 between the edges 19.

The second fastener member 30 has a substantially smooth engagement surface 38, a portion of which is heat sealed or otherwise heat welded to the sidewall 14.

Referring to FIG. 2, there is shown schematically a first heating element 40 spaced from the sidewall 13 and extending from a first end 41 aligned with the end 25 of the flange 24 of the first fastener member 20 to a second end 42 aligned with the wall 21 of the first fastener member 20. The heating element 40 and associated conventional welding or heat apparatus operate to heat seal or weld the first fastener member 20 to the sidewall 13 of the pouch throughout substantially the full breadth from near the end 25 to the wall 21, which heat seal or weld may be continuous or intermittent.

Spaced from the sidewall 14 is a second heating element 45 which extends from a first end 46 aligned near the end 35 of the second fastener member 30 to a second end 47 aligned with the wall 33 of the second fastener member 30. As a result of heating in only that area, only that portion of the second fastener member 30 near the end 35 and near the wall 33 will be heat sealed or welded to the sidewall 14 and that portion of the second fastener member 30 near the wall 33 and the first hook 31 will not be welded or heat sealed to the sidewall 14.

During the heat sealing operation, the standoffs 36 and 37 will serve to maintain gaps 39 between the flange 24 of the first fastener member 20 and the flange 34 (except for the ends of the standoffs 36 and 37) of the second fastener member 30 to prevent the flange 24 from becoming heat sealed to the flange 34. This is true irrespective of whether the first fastener member 20 is heat sealed or welded to the side wall 13 simultaneously with the heat sealing or welding of the second fastener member 30 to the side wall 14 or is heat sealed or welded at a different time, i.e. consecutively.

Referring to FIGS. 4 and 5, there is shown a further embodiment of a reclosable plastic bag 110 having a pouch 112 and a first fastener member 120 engaged to a second fastener member 130. The pouch 112 has a sidewall 113 to which the first fastener member 120 is heat sealed and a second sidewall 114 to which the second fastener element is heat sealed.

The pouch 112 has sidewalls 113 and 114 which extend between a gusseted bottom 115 joining the sidewalls 113 and 114 together and an open mouth defined by edges 117 for sidewall 113 and 118 for sidewall 114. The sidewalls 113 and 114 are joined together at side edges which extend between the gusseted bottom 115 and the respective edges 117 and 118.

The first fastener member 120 is heat sealed to sidewall 113 and includes (i) a wall 121 extending inwardly toward the sidewall 114 and having a surface facing the gusseted bottom 115, (ii) a hook 122 spaced therefrom and cooperating therewith to define a first groove and (iii) a second hook 123 spaced from and having a similar cross-sectional configuration as the first hook 122 and cooperating therewith to define a second groove. Extending from the second hook 123 toward the edge 117 of sidewall 113 is a flange 124 which has a thickness substantially greater than that of the pouch 112. The flange 124 extends to an end 125 which preferably is spaced from the edge 117 of the sidewall 113. The flange 124 has substantially greater breadth from the second hook 123 to the end 125 than the flange 24 of the embodiment of FIGS. 1 and 2. The first fastener member 120 has a substantially smooth engagement surface 128 facing and heat sealed or otherwise heat welded to the sidewall 113.

Heat sealed or otherwise heat welded to the other sidewall 114 is the second fastener member 130. The second fastener member 130 includes a first hook 131 which is sized and shaped to be snugly received in the groove defined by the wall 121 and first hook 122 of the first fastener member 120. The second fastener member 130 is further provided with a second hook 132 having a similar cross-sectional configuration as that of the first hook 131 of the second fastener member 130. The second hook 132 is sized and shaped to be snugly received in the groove between the first hook 122 and second hook 123 of the first fastener member 120.

Spaced from the second hook 132 is a wall 133 which cooperates with the second hook 132 to defined a groove in which is positioned the second hook 123 of the first fastener member 120. The groove defined by the second fastener member second hook 132 and wall 133 is similar in size and shape to and snugly receives the second hook 123 of the first fastener member 120.

Extending outwardly toward the edge 118 of the sidewall 114 is a flange 134 which extends to an end 135 spaced inwardly toward the gusseted bottom 115 from the edge 118. Extending outwardly from the flange 134 toward the flange 124 are a plurality of spaced apart standoffs 136, the first of which is spaced from the wall 133.

The first and second hooks 131 and 132, the wall 133 and the standoffs 136 of the second fastener member 130 extend substantially across the full width of the pouch 112 from edge to edge. Similarly, the wall 121 and hooks 122 and 123 of the first fastener member 120 extend substantially across the full width of the pouch 112.

The second fastener member 130 has a substantially smooth engagement surface 138 facing and heat sealed or otherwise heat welded to the sidewall 114.

Referring to FIG. 5, there is shown schematically a first heating element 140 spaced from the sidewall 113 and extending from a first end 141 aligned near the end 125 of the flange 124 of the first fastener member 120 to a second end 142 aligned near the wall 121 of the first fastener member 120. The heating element 140 and associated conventional welding or heat apparatus operate to heat seal or weld the first fastener member 120 to the sidewall 113 of the pouch throughout substantially the full breadth from near the end 125 to near the wall 121, continuous or intermittent.

Spaced from the sidewall 114 is a second heating element 145 which extends from a first end 146 aligned near the end 135 of the second fastener member 130 to a second end 147 aligned with the wall 133 of the second fastener member 130. As a result of heating and/or welding in only that area, only that portion of the second fastener member 130 between near the end 135 and the wall 133 will be heat sealed or welded to the sidewall 114 and that portion of the second fastener member 130 between the wall 133 and the first hook 131 will not be welded or heat sealed to the sidewall 114. During the heat sealing or welding operation, the standoffs 136 will serve to maintain gaps 139 between the flange 124 of the first fastener member 120 and the flange 134 of the second fastener member 130 to prevent the flange 124 from becoming heat sealed or welded to the flange 134.

Referring to FIG. 6, there is shown a bag 210 having a pouch 212 with a sidewall 213 to which is heat sealed or welded a first fastener member 220, which is identical to the fastener element shown in FIGS. 1 and 2, and a second sidewall 214 to which is heat sealed or welded a second fastener member 230, which is identical to the fastener member 30 of the embodiment of FIGS. 1 and 2. The difference between the embodiment of FIG. 6 and that of FIGS. 1 and 2 is the extent to which the respective fastener members 220 and 230 are heat sealed or welded to their respective sidewalls 213 and 214. As can be seen in FIG. 6, the sidewalls 213 and 214 are shown as being spread to a spaced apart position as they would be with the bag 210 filled with product being stored. The fastener members 220 and. 230 are engaged to one another so that the bag 210 is closed. The areas shown in FIG. 6 in which the sidewall 213 is spaced from the surface 228 of the first fastening element 220 and the second sidewall 214 is spaced from the engagement surface 238 of the second fastening element 230 represent the areas in which such sidewalls 213 and 214 are not heat sealed or welded to their respective fastener members 220 and 230.

According to this embodiment of the invention, it is preferred that the sidewall 213 be heat sealed or welded to the first fastener member 220 from substantially near the end 225 throughout a distance of approximately ⅞ of the breadth of the fastener member which is the distance between such end 225 and the wall 221.

It is preferred that the sidewall 214 be adhered to the second fastener member 230 from near its end 235 for a portion or all of the distance between near such end 235 and the wall 233, but not beyond the wall 233. It has been found that by locating the extent of the welds or heat seals in this manner, the bag 210 is significantly more difficult to open on the inside/product side and requires more force to open as a result of pressures generated on the inside than the force required to open by a consumer pulling on the portions adjacent to the ends 217 and 218.

Many modifications will become readily apparent to those skilled in the art. For example, if desired, the standoffs could be formed on the flanges of both of the fastener members in staggered relationship to one another. Accordingly, the scope of the present invention should be determined only by the scope of the claims appended hereto.

We claim:
1. A reclosable bag comprising
   (a) a film pouch having a pair of sidewalls cooperating to define a closed bottom, each of said sidewalls extending to an upper edge, a pair of closed side edges extending from said bottom to said upper edges;
   (b) a first extruded fastener member heat sealed or welded to one of said sidewalls in the area of said upper edges, said first fastener member having (i) hooks and grooves defining gripping means and (ii) a flange extending from said gripping means toward said upper edges, said flange having a substantially uniform thickness;
   (c) a second extruded fastener member engaged to the other of said sidewalls, said second fastener member having (i) hooks and grooves defining engagement means engageable to said first fastener gripping means and (ii) a flange extending from said engagement means toward said upper edges, said flange having a substantially uniform thickness; and
   (d) a plurality of spaced apart elements extruded with and extending from one of said flanges to an end positioned to contact the other of said flanges, said spaced apart elements being integral and unitary with said one flange in an area of said one flange between (1) said upper edges and (2) the hooks and grooves of said one flange and providing gaps between said flanges while said engagement means are engaged to said gripping means.

2. A reclosable bag of claim 1, wherein only the flange portion or a portion thereof of one of said fastener members is heat sealed or welded to said film sidewall.

3. A reclosable bag comprising
   (a) a film pouch having a pair of sidewalls cooperating to define a closed bottom, each of said sidewalls extending to an upper edge, a pair of closed side edges extending from said bottom to said upper edges,
   (b) a first extruded fastener member in the area of said upper edges, said first fastener member having hooks and grooves defining gripping means and a flange extending from said gripping means toward said upper edges, said flange having a substantially uniform thickness;
   (c) a second extruded fastener member in the area of said upper edges, said second fastener member having hook and grooves defining engagement means engageable to said first fastener gripping means and a flange extending from said engagement means toward said upper edges, said flange having a substantially uniform thickness; and
   (d) a plurality of spaced apart elements extruded with and extending from one of said flanges as a unitary part thereof to an end positioned to contact the other of said flanges to provide gaps between said flanges; each of said fasteners having a breadth extending from a flange end in the area of said film upper edges to an engagement end spaced therefrom in the direction of said bottom, one of said fastener members being heat sealed or welded to said film only at the flange or a portion thereof and the other of said fasteners being heat sealed or welded to said film at least in the area underlying said gripping means or said engagement means.

4. A reclosable plastic bag comprising (a) a film pouch having a pair of sidewalls cooperating to define a closed bottom, each of said sidewalls extending to an upper edge, a pair of closed side edges extending from said bottom to said upper edges;

(b) a first extruded fastener member heat sealed or welded to one of said sidewalls in the area of said upper edges, said first fastener member having (i) gripping means and (ii) a flange extending from said gripping means toward said upper edges, said flange having a substantially uniform thickness;

(c) a second extruded fastener member engaged to the other of said sidewalls, said second fastener member having (i) engagement means engageable to said first fastener gripping means and (ii) a flange extending from said engagement means toward said upper edges, said flange having a substantially uniform thickness; and (d) means extruded with and integral with one of said flanges for providing a plurality of gaps between said flanges while said engagement means are engaged to said gripping means, each of said fasteners having a breadth extending from a flange end in the area of said film upper edges to an engagement end spaced therefrom in the direction of said bottom and wherein the only portion of one of said fastener members that sealed or welded to said film is the flange or a portion thereof and the only portion of the other of said fasteners heat sealed or welded to said film is in continuous or intermittent areas 90% to 98% of said breadth extending from said flange end.

* * * * *